United States Patent Office 3,397,141
Patented Aug. 13, 1968

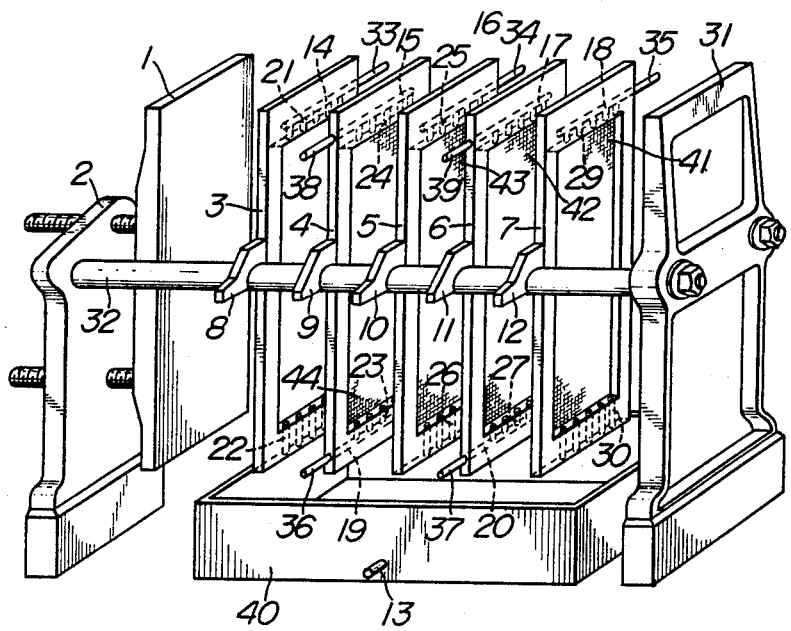

3,397,141
METHOD FOR SEPARATING CONCENTRATED SOLUTION OF ELECTROLYTE FROM HIGH VISCOUS SOLUTION BY DIALYSIS AND AN APPARATUS THEREFOR
Shiro Nakai, Hirakata-shi, Japan, assignor to Kimura Entetsu, Kagaku Kikai Co., Ltd.
Filed Apr. 21, 1966, Ser. No. 544,218
Claims priority, application Japan, Dec. 10, 1965, 40/75,709
4 Claims. (Cl. 210—22)

ABSTRACT OF THE DISCLOSURE

A dialysis process for recovering an electrolyte from a highly viscous solution having a viscosity of 20 to 700 poises by feeding the solution into dialyzate cells from the top in a distributed state, allowing the solution to flow downwardly only by gravity into an open receiver, while feeding a receiving solvent into diffusate cells from the bottom in a distributed state, allowing the solvent to flow upwardly only and then collecting and withdrawing the resultant diffusate, the solution and solvent passing alternately countercurrentwise without pressure difference therebetween through a plurality of cells tightly clamped together with membranes therebetween.

The present invention relates to a process for dialyzing a highly viscous neutral, acidic or alkaline solution formed in the manufacturing processes of various chemical industries to remove any electrolyte contained in said solution as much as possible or to recover a high concentrated solution of the electrolyte for the purpose of utilizing said solution effectively, and further relates to an apparatus therefor.

In order to effect the process efficiently, it is desirable to employ dialysis membranes as thin as possible. Therefore, there is naturally a limit to the mechanical strength of the membranes. As the mechanical strength of dialysis membranes usually employed is relatively low, the difference of liquid pressures on both sides of the membranes should be kept small. In the conventional dialyzers, the troubles caused by the pressure difference due to specific gravities between a solution to be dialyzed or an undialyzed solution and a receiving solvent, have been overcome simply by adjusting the feed pressure of said two liquids. However, such a method has been impossible to solve the problem in case the difference of viscosities between those two liquids is large.

Also, in order to obtain a better effect of dialysis, it is desirable that the flow speeds of the two liquids be high.

The higher the flow speeds of the liquids, however, the larger the difference between the liquid pressures at the feed side and the discharge side will become and the higher the flow resistance in pipes will be. This will be more serious if the viscosities of the liquids are increased. Therefore, it has been difficult to dialyze a high viscous solution by any conventional dialyzers.

Also, the higher the flow speed of a receiving solvent relative to the flow speed of an undialyzed solution flowing on the unit area of the surface of dialysis membranes, the more concentrated the diffusate will be.

In order to obtain such a high flow speed of the receiving solvent, it is necessary to apply a forced circulation, and the membranes are liable to be damaged if the circulation is applied to a highly viscous solution. Therefore, it will be extremely difficult to dialyze a highly viscous solution.

In the present method, as the liquid to be dialyzed is caused to flow uniformly from the top to the open bottom, the flow rate can be increased particularly without the increase of pressure on the membrane in spite of the fact the liquid to be dialyzed is a high viscosity solution and corresponds to a liquid column of considerable height. On the other hand, damage of a thin membrane having a good dialysis effect can be prevented by annulling the liquid pressure difference between undialyzed liquid and diffusate by elevating the diffusate pressure uniformly and one-sidedly, though the liquid pressure increases. Further, good dialysis effect can be obtained because the counter-current contact is effected with the membrane therebetween. When the present apparatus is used with a liquid to be dialyzed of low viscosity for example, when alkali is recovered from waste aqueous alkaline solution, the downwardly flowing velocity of the liquid to be dialyzed become excessively high, and a chance for the damage of the membrane due to the wide difference between both liquid pressures is increased. Thus, the present apparatus is not applicable to such a case.

An object of the present invention is to provide a method for efficiently separating a concentrated solution of an electrolyte or electrolytes from a highly viscous solution by dialysis.

Another object is to provide a dialyzer which may be employed in the practice of the above-mentioned method of this invention.

According to the present invention, there is provided a method for recovering a concentrated solution of an electrolyte or electrolytes which comprises feeding said high viscous undialyzed liquid into each dialyzate cell from the top thereof, allowing the liquid to flow downward only, then withdrawing the resultant dialyzate from the dialyzing system, while feeding a receiving solvent into each diffusate cell from the bottom thereof, allowing the solvent to flow upward only, then collecting and withdrawing the resultant diffusate from the system, and, if necessary, recycling the recovered diffusate repeatedly to the diffusate cells by a forced circulating pump, and which is characterized by said undialyzed liquid and said receiving solvent passing through a plurality of screens in the dialyzate cells and diffusate cells which are arranged at an interval from one another and tightly clamped together through membranes and containing buffers inside them for putting up the membranes and for slowing down the upward or downward flow of the two liquids.

According to the present invention, there is also provided a filter-press type multicell dialyzer characterized by a plurality of screens constructed by putting up membranes on screen frames containing buffers inside them and installed between end plates, said plurality of screens being able to be freely slid and pressed by one end plate, and passages for a receiving solvent or an undialyzed solution being connected to the lower frame or the upper frame of each screen, and pores for a vertical passage for allowing the undialyzed solution to flow only downward along the surface of a membrane and to be uniformly dispersed and installed at the upper and lower frames of each of alternate screens and whereas pores for a vertical passage for allowing the receiving solvent to flow only upward along the surface of a membrane and being uniformly dispersed and installed at the lower and upper frames of each of the other alternate screens.

Thus, a dialysis of a highly viscous solution has been made practical for the first time by the present invention wherein buffers are placed in said screen frames for putting up the membranes and slowing down the upward or downward flow of the two liquids.

This is surprising and unexpected considering the fact that no baffles or flow deflectors have been heretofore put in a cell because mixing or turbulence in two liquids has been considered to have a harmful effect upon the efficiency of the dialysis.

The conventional, well-known apparatus (of course, for the low viscosity liquid use) comprises placing the frames for the liquid to be dialysed and those for the diffusate alternately one by one, providing the membranes therebetween and passing the respective liquids through the respective frames always alternately and continuously, or comprises providing thin compartments partitioned by the membranes with a vessel, filling the liquid to be dialysed in the vessel and passing a diffusate through the compartments. Dialysis of high viscosity liquid in those apparatuses is quite impractical because of the damage of the membrane.

The dialysis apparatus for the high viscosity solution has been completed for the first time only by causing the liquid to flow down to be dialysed uniformly and one-sidedly as in the present invention.

One embodiment of the present invention is described in detail in reference to the accompanying drawing in which a typical filter-press type multicell dialyzer of the present invention is shown. Press frame 1 is attached to an end plate 2 so that the frame may freely slide. In each of screen frames 3, 4, 5, 6 and 7 respectively having arms 8, 9, 10, 11 and 12 on both sides, there is buried buffers (not shown) such as a metal or synthetic resin wire net for preventing a dialysis membrane from being deformed and for slowing down the upward or downward flow of the liquids in these frames. 14, 15, 16, 17, 18, 19 and 20 are passages or conduits for the liquids. Plurality of slits 21-30 are installed toward or from the inside of the frame at equal intervals and preferably with larger diameter at points located farther from the inlet or outlet, for example, in passage 14, in order that the liquids may uniformly pass in the frame and on the membrane. Slits 22, 26 and 30 penetrating from the inside to the outside are installed at the lower part of screen frames 3, 5 and 7. Screen frames thus formed are placed between two bolts connecting said end plate 2 and Macdonald frame 31, and supported in mid-air with arms 8, 9, 10, 11 and 12 so that they may be freely slid.

Press frame 1 is first moved to a position as close as possible to the end plate 2. Screen frames 3, 4, 5 and 6 are also moved toward the press frame 1, and screen frame 7 alone is moved to a position close to said Macdonald frame 31. A membrane 41 which has been previously immersed in a suitable liquid such as water, is placed carefully on the body fo screen frame 7 except the slit part thereof, and on a buffer which has been previously put up in the screen frame, so as to be spreaded bisymmetrically and then a rubber packing (not shown) is tightly attached thereto. Screen frame 6 is then moved to a position adjacent to screen frame 7, and a membrane 42 is attached to the screen frame 6 as in the screen frame 7. This operation is then repeated for screen frames 5 and 4 to attach membranes 43 and 44 respectively to the frames.

No membrane is attached to screen frame 3, which is then moved toward Macdonald frame 31. Finally, all the frames are pressed together by the press frame 1 so that a highly viscous solution and a receiving solvent may not leak from a gap between the screen frames.

The highly viscous undialyzed solution enters passages 14, 16 and 18 through conduits 33, 34 and 35 diverged from a main inlet pipe and flows downward and uniformly on the surface of the membrane, and comes one sidedly into a receiving tank 40 through said slits 22, 26 and 30. On the other hand, a receiving solvent enters passages 19 and 20 through conduits 36 and 37 diverged from a main inlet pipe, and flows upward on the surface of the membrane, being uniformly dispersed through the conduits 23 and 27, and overflows also one sidedly through conduits 24 and 28, and is discharged into a main outlet pipe through the branch pipes 38 and 39. Meanwhile the liquid to be dialyzed in the dialyzate cells is partitioned off from the receiving solvent in the diffusate cells by the membranes, and some or all of a diffusible electrolytes pass into the receiving solvent. At that time, the pressure of the receiving solvent is always adjusted at one end of the main feeding pipe so as to approximate always to the pressure of the undialyzed solution which is kept at a pressure close to the minimum pressure necessary to perform the dialysis. Thus the difference of pressure between the two liquids may be maintained at a very low value by this invention, so that the dialysis may be carried out without breaking the membranes.

The dialyzate collected in a receiving tank 40 may be either recycled to the dialyzate cells from an outlet 13 to repeat the dialyzing operation by this dialyzer or transferred to a subsequent process, whereas the diffusate which has received an electrolyte or electrolytes from the highly viscous undialyzed solution, may be taken out of the system from main pipe through said divided pipes 38 and 39.

If it is desired that the diffusate is further used to obtain a diffusate highly containing the electrolyte or electrolytes, the diffusate from the said main pipe is transferred into a tank having the same pressure as that of the tank 40 for the dialyzate, for example, having an atmospheric pressure. The diffusate is then supplied to the divided pipes through the main inlet pipe by a forced circulating pump to effect the dialysis repeatedly on the surfaces of the membranes in the diffusate cells. When the concentration of the electrolyte or electrolytes in the diffusate in the tank has reached a definite concentration, a definite amount of water is supplied to remove an amount of the diffusate corresponding to the amount of water out of the system.

The present invention may be more fully understood by the following example which is afforded by way of illustration and not by way of limitation.

Example

A filter-press type multicell dialyzer employed herein consist of iron screen frames having a width of 640 millimeters and a height of 1,200 millimeters and is tightly clamped together with 160 rubber packings inserted between frames. A wire net is filled up inside of each said screen frames, and on the wire net there is spread out a calico cloth consisting of 88 cotton wefts of yarn count 30 (in English standard) and 90 cotton warps of yarn count 40 (in English standard), which cloth has been uniformly coated with a solution prepared by dissolving viscose containing 8.6 percent by weight of cellulose and 5.2 percent by weight of alkali in fifth times the amount of soft water and treated with about 2.5 percent by weight of sulfuric acid to regenerate the cellulose and then washed with water and once more subjected to the above-mentioned operations of coating with the dilute viscose solution, treating with the acid and washing with water to be spread out loosely.

A highly viscous waste solution of sodium xanthogenate of cellulose to be dialyzed having a viscosity of 20 to 700 poises, and containing 8.6 percent by weight of cellulose and 5.2 percent by weight of an alkali at about 20° C. was allowed to flow downward only on the surface of the membranes in the dialyzate cells at a rate of about 0.57 liter per minute per each frame, that is 46,000 liters per 24 hours in total, whereas water at about 20° C. as a receiving solvent was allowed to flow upward only on the surface of the membranes in the diffusate cells at a rate of about 0.4 liter per minute per each frame, that is 32,000 liters per 24 hours in total and then taken out of the system. Thus about 7.5 percent by weight of an electrolyte sodium hydroxide, contained in the highly viscous solution was passed into the receiving solvent and the diffusate containing 6.5 grams per liter of the alkali was continuously recovered to be reused for preparing viscose and thereby a manufacturing cost of regenerated cellulose was greatly reduced.

Further, when said diffusate was continuously overflowed into an open tank and about 32 liters per minute of the diffusate in the tank was recycled six times using a forced circulating pump by continuously supplying the same 32 liters per minute of water into the tank, a diffusate containing 8 grams per liter of sodium hydroxide obtained.

What is claimed is:
1. A recovering process of an electrolyte from a highly viscous solution having a viscosity of 20 to 700 poises by a dialysis with membranes between dialyzate cells and diffusate cells, which comprises feeding the highly viscous solution into all dialyzate cells from the top in a distributed state, allowing the solution to flow downward only by gravity into an open receiver, while feeding a receiving solvent to recover the electrolyte into all diffusate cells from the bottom in a distributed state, allowing the solvent to flow upward only and then collecting and withdrawing the resultant diffusate containing the recovered electrolyte from the system, said undialyzed solution and said receiving solvent passing alternately countercurrentwise without pressure difference therebetween through a plurality of cells alternately arranged and tightly clamped together with membranes which are placed between said cells.
2. A recovering process according to claim 1 wherein the recovered diffusate is transferred into a tank having the same pressure as that of diffusate, and the diffusate is forced to effect the dialysis repeatedly in the diffusate cells and the then recovered diffusate is removed by supplying an amount of the receiving solvent corresponding to the diffusate into the tank using a forced circulating pump in order to obtain the diffusate highly containing the electrolyte.
3. A recovering process according to claim 1 wherein the electrolyte to be recovered is an alkali and the highly viscous solution is a waste sodium xanthogenate of cellulose in a preparation of viscose rayon.
4. A multicell dialysis apparatus of filter-press type for recovering an electrolyte from a highly viscous solution having a viscosity of 20 to 700 poises by a dialysis which comprises a plurality of unit cells consisting of a dialyzate cell and a diffusate cell, each cell comprising a frame and a buffer of wire netting having a considerable thickness which fills a space enveloped by the frame and acts as a retarder of liquid flow as well as renews the liquid film boundary, the said dialyzate cells and diffusate cells being arranged alternately by interposing membranes therebetween, two end plates which hold the said plurality of unit cells by placing the membranes therebetween, two vertical feeding means one of which is located in a distributed state above the spaces for an undialyzed solution and the other below the spaces for a receiving solvent respectively, vertical, evenly discharging means for a dialyzate from the inside of dialyzate cells which are located in the bottom of the dialyzate cells, a discharging means for a diffusate from the diffusate cells which is located above the space of diffusate cells, vertical connecting means which connect the feeding means with the inside of dialyzate cells for the undialyzate cells for the undialyzed solution and are located above the buffers in the dialyzate cells, two kinds of vertical connecting means one of which connects the feeding means with the inside of the diffusate cells for receiving solvent and is located below the buffers in the diffusate cells and the other connects the inside of the diffusate cells with the discharging means for the diffusate and is located above the buffers in the diffusate cells, the said vertical discharging means for the dialyzate, vertical connecting means for the undialyzate solution, two kinds of vertical connecting means for respective receiving solvent and diffusate effecting only downward flows of the undialyzed solution by gravity and only upward flows of the receiving solvent on surfaces of the membranes in a uniformly dispersed state, and an open receiver provided below said cells.

References Cited
UNITED STATES PATENTS

| | | | |
|---|---|---|---|
| 2,247,143 | 6/1961 | Bailey | 210—21 |
| 665,116 | 1/1901 | Kohn | 127—10 |
| 790,035 | 5/1905 | Deusy | 127—10 X |
| 2,040,805 | 5/1936 | Casey | 127—10 X |
| 2,187,818 | 1/1940 | Johannes et al. | 210—321 |
| 2,225,024 | 12/1940 | Weber | 127—10 X |
| 2,365,457 | 12/1944 | Daniel | 210—22 |
| 2,399,471 | 4/1946 | Daniel et al. | 210—321 X |
| 2,664,395 | 12/1953 | Marchand | 210—321 |

FOREIGN PATENTS

| | | |
|---|---|---|
| 418,959 | 11/1934 | Great Britain. |

REUBEN FRIEDMAN, *Primary Examiner.*

F. A. SPEAR, *Assistant Examiner.*